United States Patent
Alen et al.

(10) Patent No.: US 6,324,412 B1
(45) Date of Patent: *Nov. 27, 2001

(54) TELEPHONE AND MODULE HAVING A PIN FOR PROVIDING TEMPERATURE INFORMATION AND GENERATING A SILENT ALARM

(75) Inventors: Matti Alen, Salo; Mika Kaustinen, Kaustinen; Torsti Halonen, Muurla; Pertti Kangas, Oulu; Matti Ahonen, Tampere; Jarmo Heinonen, Pertteli, all of (FI)

(73) Assignee: Nokia Mobile Phones, Ltd., Salo (FI)

( * ) Notice: This patent issued on a continued prosecution application filed under 37 CFR 1.53(d), and is subject to the twenty year patent term provisions of 35 U.S.C. 154(a)(2).

Subject to any disclaimer, the term of this patent is extended or adjusted under 35 U.S.C. 154(b) by 0 days.

(21) Appl. No.: 09/076,945

(22) Filed: May 13, 1998

Related U.S. Application Data

(63) Continuation-in-part of application No. 08/490,843, filed on Jun. 15, 1995, now abandoned.

(30) Foreign Application Priority Data

Jun. 17, 1994 (FI) .......................................................... 942918

(51) Int. Cl.⁷ ............................... H04M 1/00; H01M 2/10
(52) U.S. Cl. ............................................ 455/567; 429/98
(58) Field of Search ................................ 455/567; 429/98

(56) References Cited

U.S. PATENT DOCUMENTS

| | | |
|---|---|---|
| 3,939,083 | 2/1976 | Coppock et al. . |
| 4,278,844 | 7/1981 | Jones .................................. 179/18 B |
| 4,873,719 | 10/1989 | Reese .................................. 379/215 |
| 4,904,997 | 2/1990 | Chen et al. ..................... 370/870.17 |
| 4,924,496 | 5/1990 | Figa et al. ............................. 379/142 |
| 4,998,291 | 3/1991 | Marui et al. ............................. 455/89 |
| 5,029,196 | 7/1991 | Morganstein ........................... 379/67 |
| 5,189,389 | 2/1993 | Deluca et al. ..................... 340/311.1 |
| 5,360,683 | 11/1994 | Broadfield .............................. 429/99 |
| 5,414,392 | 5/1995 | Schupak ............................... 332/118 |
| 5,428,439 | 6/1995 | Parker et al. . |
| 5,452,354 | 9/1995 | Kyronlahti et al. . |
| 5,460,901 | 10/1995 | Syrjala . |
| 5,489,834 | 2/1996 | Pitkanen . |
| 5,630,209 | 5/1997 | Wizgall et al. ........................ 455/66 |
| 5,661,471 | 8/1997 | Kotlicki .......................... 340/825.37 |
| 5,663,703 | 9/1997 | Pearlman ......................... 340/407.1 |
| 5,786,106 | * 7/1998 | Armani ................................. 429/98 |

FOREIGN PATENT DOCUMENTS

| | | |
|---|---|---|
| 0 330 856 A2 | 9/1989 | (EP) . |
| 0 347 155 A2 | 12/1989 | (EP) . |
| A 355 777 A2 | 2/1990 | (EP) . |
| 0 467 071 | 1/1992 | (EP) . |
| 000688125A1 | * 6/1994 | (EP) . |
| 0 688 125 A1 | 12/1995 | (EP) . |
| 2 173 069 A | 10/1986 | (GB) . |
| 2 248 709 | 4/1992 | (GB) . |
| 2250891 | * 6/1992 | (GB) . |
| 2 269 072 | 1/1994 | (GB) . |
| WO 90/13196 | 11/1990 | (WO) . |

OTHER PUBLICATIONS

U.S. Ser. No.: 07/985,841, Filing Date: Dec. 3, 1992; Title: Radio Telephone with a Combined Battery and Support Structure; Art Unit: 2611; Pending.

* cited by examiner

Primary Examiner—William Cumming
(74) Attorney, Agent, or Firm—Perman & Green, LLP

(57) ABSTRACT

A module for detachable connection to a telephone and a telephone employing such a module. The module includes a device for generating a silent alarm and a system for actuating the silent alarm when connected to the telephone for indicating an incoming call. A pin which provides information about the temperature of the module during charging provides the connection for actuating the silent alarm.

10 Claims, 4 Drawing Sheets

TELEPHONE AND MODULE HAVING A PIN FOR PROVIDING TEMPERATURE INFORMATION AND GENERATING A SILENT ALARM

This application is a continuation-in-part of U.S. Pat. No. 08/490,843, filed Jun. 15, 1995, now abandoned.

BACKGROUND OF THE INVENTION

The invention relates to a telephone and particularly a mobile telephone that uses vibration instead of, or in addition to, an ordinary audible alarm to indicate a received call signal.

Usually, a telephone indicates a received call with an audible alarm, but in some cases and especially with mobile telephones the audible alarm may be disturbing. Then it is possible to use a vibrating alarm which means that the user who has the telephone in hand or in a pocket feels the vibration instead of hearing an audible alarm and is thus informed about a call.

There are a few known prior art telephones using a vibrating indicator. One such telephone is described in international patent application WO 93/15590, where a radio apparatus includes a means for receiving an information signal, a means for generating a silent alarm, a means for generating an audible alarm, and a means for activating a silent alarm for a first predetermined period and for activating an audible alarm for a second predetermined period on the basis of the received signal. The silent alarm is brought about by a vibrator which according to the drawing associated with the description is fixedly connected to the control part of the telephone and located beside the microphone/earpiece set.

As mentioned before, a silent alarm is desirable in some cases, but, in practice, most users will not need that function since it is always possible to turn the telephone off in solemn or important occasions in which silence is required. Therefore, a fixed vibrating alarm in a telephone increases the costs even if the user will not need one. This is a disadvantage, as telephones and particularly mobile telephones are becoming consumer products the base price of which should be kept as low as possible.

SUMMARY OF THE INVENTION

According to a first apect of the invention there is provided a module for detachable connection to a telephone, comprising silent alarm means for generating a silent alarm, wherein the silent alarm means is actuable when connected to the telephone for indicating an incoming phone call, and according to a second aspect of the invention there is provided a telephone comprising means for generating a silent alarm, means for generating an audible alarm, and a means for activating a silent alarm on the basis of a control signal characterised in that the means for generating a silent alarm is arranged in a module which is detachably connectable to the telephone.

This has the advantage that the a silent alarm facility can be incorporated into a telephone as an option unlike in the prior art. This is accomplished by connecting detachably connectable means for generating a silent alarm to the mobile phone.

By applying the invention the basic part of the telephone can be kept as simple as possible. The silent alarm can be advantageously implemented as a means in a separate module which can be connected detachably to the mobile phone. This module can comprise the silent alarm means alone or it can also comprise for example a battery whereby it can be a separate detachable connectable battery pack comprising silent alarm means. The user can, according to his needs, choose a battery pack with a silent alarm or without one. Or alternatively he can purchase a separate silent alarm module which is detachably connectable to the mobile phone for example under an openable back cover of the phone if he wishes to have a silent alarm in his phone. The means of silent alarm is advantageously a vibrator, or a vibrating alarm device, which causes vibrations felt by the user as the telephone receives a call signal.

Advantageously, the vibrating alarm is implemented with an eccentric electric motor and the signal controlling the switch of the motor is fed via a suitable pin into a controllable switch input so that the operating current will be connected from the operating voltage of the telephone via the vibration generator and switch to the ground potential of the equipment.

Advantageously, the user can select from the alternatives of the silent alarm mode of the telephone:
 ring and vibrate;
 ring only;
 beep only;
 vibrate only; and
 silent service.

In a preferred embodiment the silent alarm is disabled when the telephone is connected to a car kit or charger or any other external device.

The invention can be advantageously applied in various types of telephones that use a separate, changeable battery unit or that has an openable cover under which the a separate silent alarm module can be placed. Typically, these include mobile telephones, but naturally the inventive vibrating alarm can be attached to other portable telephones as well, e.g. to the hand phone part of a cordless telephone. In addition, the invention could be applied in radio paging receivers and similar portable devices carried in a pocket.

Further it is advantageous that the mobile phone comprises detection means for detecting whether a detachably connectable silent alarm means has been connected to the phone. The detection means can detect whether the separate silent alarm means has been connected to the phone by checking the state of the line on which the signal controlling the silent alarm is fed. Depending on the detection the menu of the phone will either include the options "vibrate only" and "ring and vibrate" or exclude these options. In this manner the software of the phone does not need to be changed when adding a silent alarm means to the phone. Also no unnecessary options are shown when the silent alarm means is not connected to the phone.

BRIEF DESCRIPTION OF THE DRAWINGS

Embodiments of the invention will now be described, by way of example, with reference to the accompanying drawings, in which.

DETAILED DESCRIPTION OF THE INVENTION

The mobile telephone of one embodiment example is equipped with a changeable battery pack. Changeable battery packs are equipped with ordinary batteries in the power range of, for example, 800 to 3000 mAh or even wider than that. In addition, the battery packs can be equipped with a vibrating alarm, or vibrator, in accordance with the invention. The vibrating alarm indicates to the user through the sense of touch that a call is coming. This naturally requires that the user has the telephone in such a place that he can feel the vibration generated by the vibrating alarm—e.g. in hand or in a pocket near the skin. Otherwise it is practical to switch the vibrating alarm off.

Figure 1:
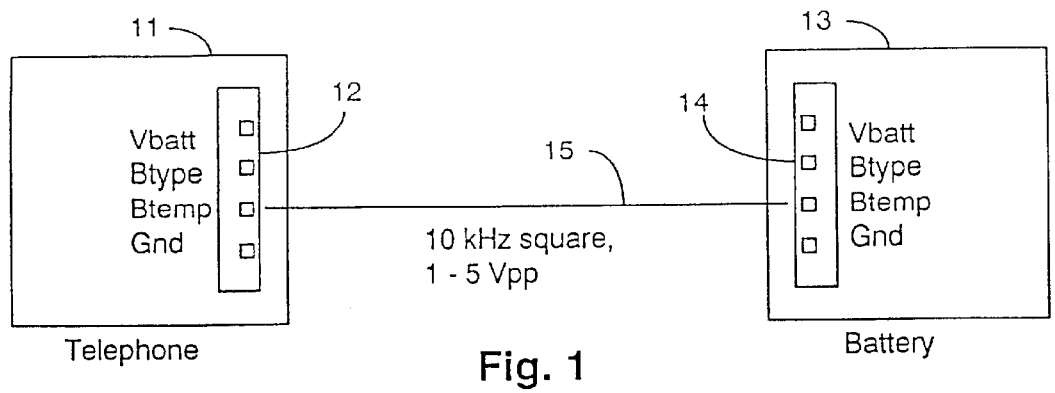
FIG. 1 shows an embodiment of the connection between a mobile telephone and a battery equipped with a vibrating alarm in accordance with the invention.

According to FIG. 1 the body 11 of the telephone includes a battery connector 12 with pins Vbatt (supply voltage, usually positive), Btype (information to the controller in the body about the type of the battery), Btemp (information about battery temperature in connection with rapid charging), and Gnd (equipment ground or zero conductor). The corresponding pins are also found on the bottom connector 14 of the battery pack 13. The body 11 of the telephone and the battery pack 13 are electrically interconnected by creating a contact between the corresponding pins. When the battery pack 13 is equipped with a vibrating alarm (not shown in FIG. 1) in accordance with the invention and is installed in a telephone, connector Btemp can be used for controlling the vibrator via connection 15. Advantageously, the control can be implemented, for example, with a 10 kHz square wave signal the amplitude of which is 1 to 5 Vpp.

As a man skilled in the art knows, the temperature measurement of a battery pack is typically realized by means of a temperature dependent resistor in the battery pack connected between the Btemp pin and the ground voltage, i.e., the Gnd pin. The resistor may be of the PTC type or the NTC type, i.e. have a negative or a positive temperature dependency coefficient. For measuring the temperature of the battery, a small voltage is applied to the Btemp pin, which creates a current through the resistor. The temperature of the battery is subsequently determined on the basis of the magnitude of the current.

Figure 5:
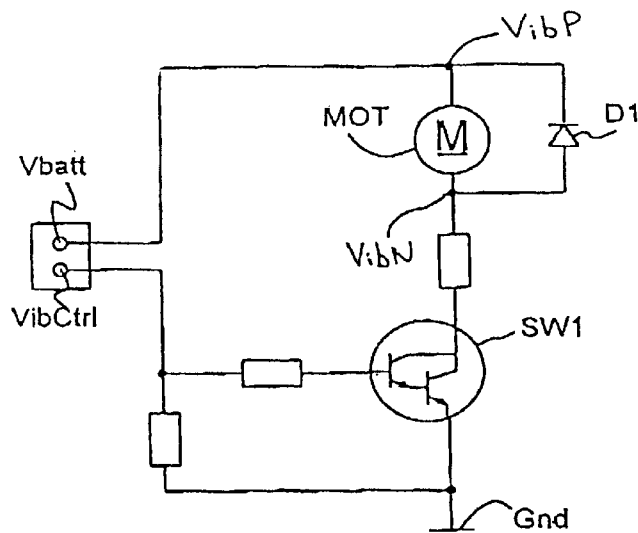
FIG. 5 shows a circuit diagram of a vibrating alarm module.

In the inventive arrangement the vibrating alarm can be implemented in a manner known to a person skilled in the art, say, with a vibration-generating eccentric motor (1 V/100 mA, for example) connected between the battery voltage Vbatt and a switch. The eccentric motor may be implemented as a DC motor equipped with an eccentric weight which causes a vibration effect when the motor is rotating fast enough. The switch can be, for example, a transistor switch (not shown in the drawings) controlled via connection 15 and pin Btemp, at the rate of the control signal brought to the transistor base. A circuit diagram for implementing the vibrating alarm and its control is shown in FIG. 5. The vibrating motor MOT is arranged between the operating voltage or battery voltage Vbatt and ground voltage Gnd by connecting its positive input VibP to the battery voltage Vbatt and its negative input VibN to ground Gnd via a transistor switch SW1 which can be, for example, a bipolar Darlington transistor. The base of the switch SW1 is connected to a control input VibCtrl which can be a separately arranged input for the separate detachably connectable vibrator module or which can be the Btemp pin of the battery connector 14 on a battery pack comprising a vibrator. By feeding a square wave signal as a control VibCtrl to the base of the transistor switch SW1 the vibrating motor is running when the signal is at high level (logical "1") whereby the transistor SW1 is conducting and when the square signal is at low level (logical "0") the transistor SW1 is shut off and the motor stops. Optionally, the signal used to control the silent alarm (the transistor switch) can be other than a square wave. A diode D1 may be connected in parallel with the motor for eliminating inductive energy peaks which the motor may cause. The resistors shown in the diagram are arranged for adapting the voltages to an appropriate level for the transistor SW1.

In such an embodiment in which the battery pack comprises a vibrator, one of the resistors shown in the figure, namely resistor R1, is preferably the temperature dependent resistor, which provides information about the temperature of the battery. In such an embodiment, the VibCtrl pin in FIG. 5 corresponds to the Btemp pin of FIG. 1. When a sufficiently low resistance measurement voltage is applied to the Btemp pin, the transistor SW1 remains closed. When the transistor SW1 is closed, the resulting current flows substantially only through the temperature dependent resistor R1, allowing determination of its resistance. When a vibrating alarm is desired, a sufficiently high voltage is applied to the Btemp pin for rendering the transistor SW1 into conduction and driving the motor MOT. Suitable values for the resistance measuring voltage and the motor control voltage depend mainly on the type of the transistor SW1, and can be determined by the man skilled in the art.

To take into account, in a manner satisfactory to the user, the various situations in which a telephone with a vibrating alarm is used, the microprocessor control of the telephone will include pre-programmed operating modes arranged in a menu, which the user can select in the same way as the other functions of the telephone. The user will be given at least the following options regarding audible/vibrating alarm:

The alarm comprises both an audible alarm and vibration ("ring and vibrate"), which can be implemented simultaneously or out of step (option b explained below in connection with FIG. 2). When this mode is selected, the audible alarm is of the type and volume selected in another menu, but, in addition, the vibrating alarm is activated when the telephone receives a call signal;

The alarm comprises audible alarm ("ring only") only, in which case the selected audible alarm type is used (option c). In this mode, the vibrating alarm is switched off;

The alarm comprises a single beep ("beep only") which advantageously can be the same as the recharge battery beep (option d). In this mode, the telephone beeps only once upon receiving a call signal from the radio path. All other audible signals of the telephone (except the recharge battery beep) are switched off during this mode;

The alarm comprises vibration only ("vibrate only", option e). In this mode, all audible signals of the telephone are disabled. Only the vibrating alarm is activated when the telephone receives a call signal; and "Silent service" (option f). In this mode, alarms or audible signals are not used. Only the display and keypad lights are operating and, in addition, the alphanumeric information is displayed in the normal manner and the call indicator light flashes when a call signal is received.

Figure 2:
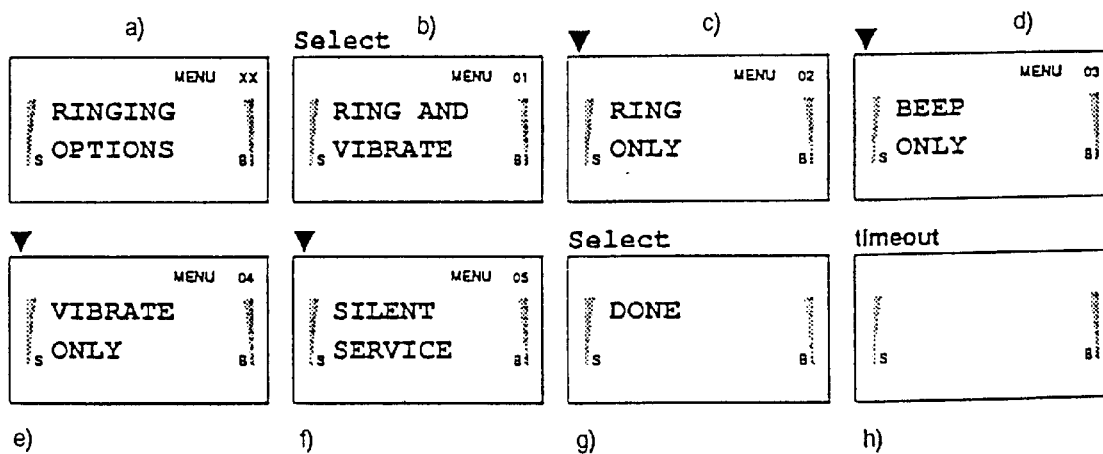
FIG. 2 shows the options for the silent alarm mode and their selection in a mobile telephone in accordance with the invention.

Selection of the above-mentioned options is illustrated in FIG. 2. In step a) the user selects the Menu option and with a suitable key brings into display the ringing options menu. Pressing the select key brings out a submenu. With the arrow key(s) the user can then browse through the different options, which are presented on the display, in the same order as described above: b) ring and vibrate; c) ring only; d) beep only; e) vibrate only; and f) silent service.

Having brought one of the options b to f into the display the user confirms his choice by pressing the select key, and the selection is then acknowledged in the display with a suitable message (e.g. "Done") in step g. After that, the display re-enters the normal operating mode, represented by step h, due to a timeout or, alternatively, an action by the user.

Figure 6A:
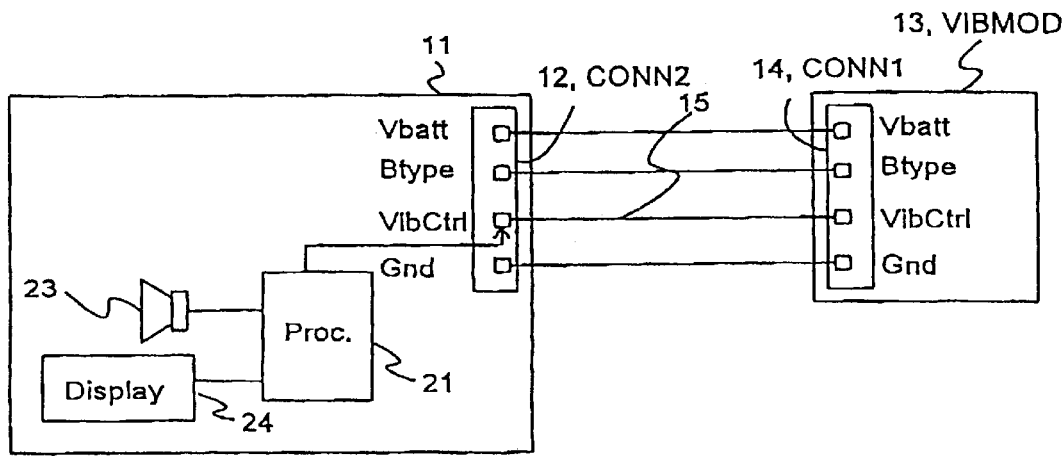
FIG. 6a shows an embodiment for detecting whether a silent alarm is connected to the phone.
Figure 6B:
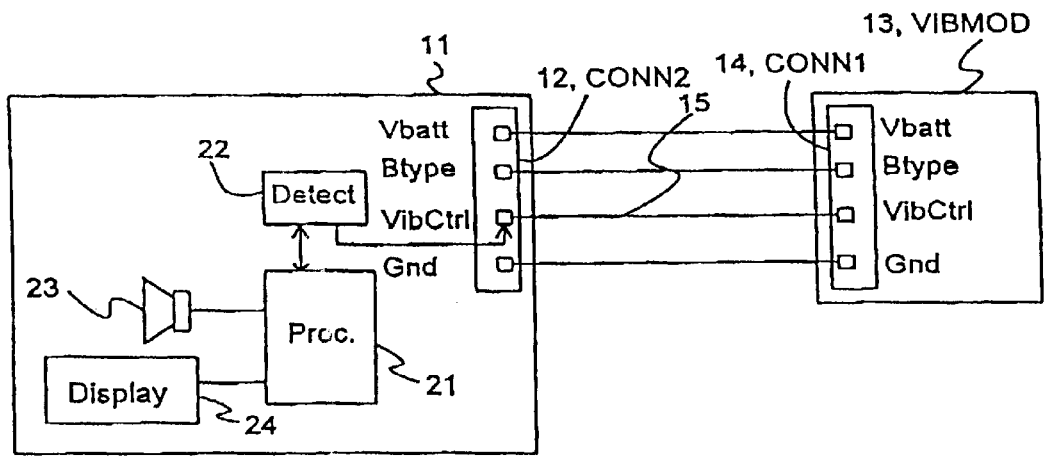
FIG. 6b shows another embodiment for detecting whether a silent alarm is connected to the phone.

The mobile phone preferably comprises detection means for detecting whether a detachably connectable silent alarm means such as a vibrator has been connected to the phone. The detection means can detect whether the separate silent alarm means has been connected to the phone by checking the state of the line on which the signal VibCtrl controlling the silent alarm is fed to the vibrator. In the embodiment shown in FIG. 1 the detection means detects the state of the Btemp line of the phone. This is shown in FIGS. 6a and 6b. The detection means may be included in a processor 21 which also controls the mobile phone as shown in FIG. 6a or the detection means 22 may be arranged as an additional circuit in the phone (FIG. 6b) with a connection to the processor 21 for informing the processor whether a vibrator is connected to the phone or not. The control signal VibCtrl is preferably sent from the processor 21 which may also cause an audible alarm by means of a loudspeaker 23.

According to the detection performed by the detection means the menu shown on the display of the phone will either enable or disable the options "vibrate only" and "ring and vibrate". The display 24 and the menu is controlled by the processor 21. In this manner the software of the phone does not need to be changed when adding a silent alarm means to the phone. Also no unnecessary options are shown when the silent alarm means is not connected to the phone.

As was mentioned earlier, use of a vibrator is practical only when the telephone is kept in hand, in a pocket or otherwise near the body. Therefore, the software of the telephone should preferably automatically disable the vibrator in all other situations (to save power, for example). Such situations in which the vibrating alarm is disabled could include, for example:

i) when the telephone is connected to a car kit or similar rack;
j) when the telephone is in a desktop charger to charge the batteries;
k) when the telephone is in a travel charger;
l) when the telephone is connected to another charger, e.g. to a cigarette lighter charger in a car;
m) when the telephone is connected to any other external device.

The situations i)–m) listed above may be detected by the processor 21 or by the detection means 22 by detecting the state of an appropriate line of the phone, e.g. the state of the Vbatt line. Here it should be noted that the silent alarm can be switched on when the telephone is connected to a headset, since in that case the telephone can be kept in a pocket and the use of the vibrating alarm is practical.

The programmed disabling mentioned above can be implemented in a manner known to one skilled in the art, using a means of detection in the telephone to indicate that the telephone is connected to a car kit and/or charger. Preferably, the inverse operation is also implemented, i.e. the vibrator should be switched back on when the telephone ceases to be in one of the situations i to m listed above. Then it is advantageously arranged that the vibrator, or the vibrating alarm, is automatically switched into the operating mode (one of modes b to f) that had been selected before the vibrator was switched off because of one of the reasons i to m.

Figure 3:
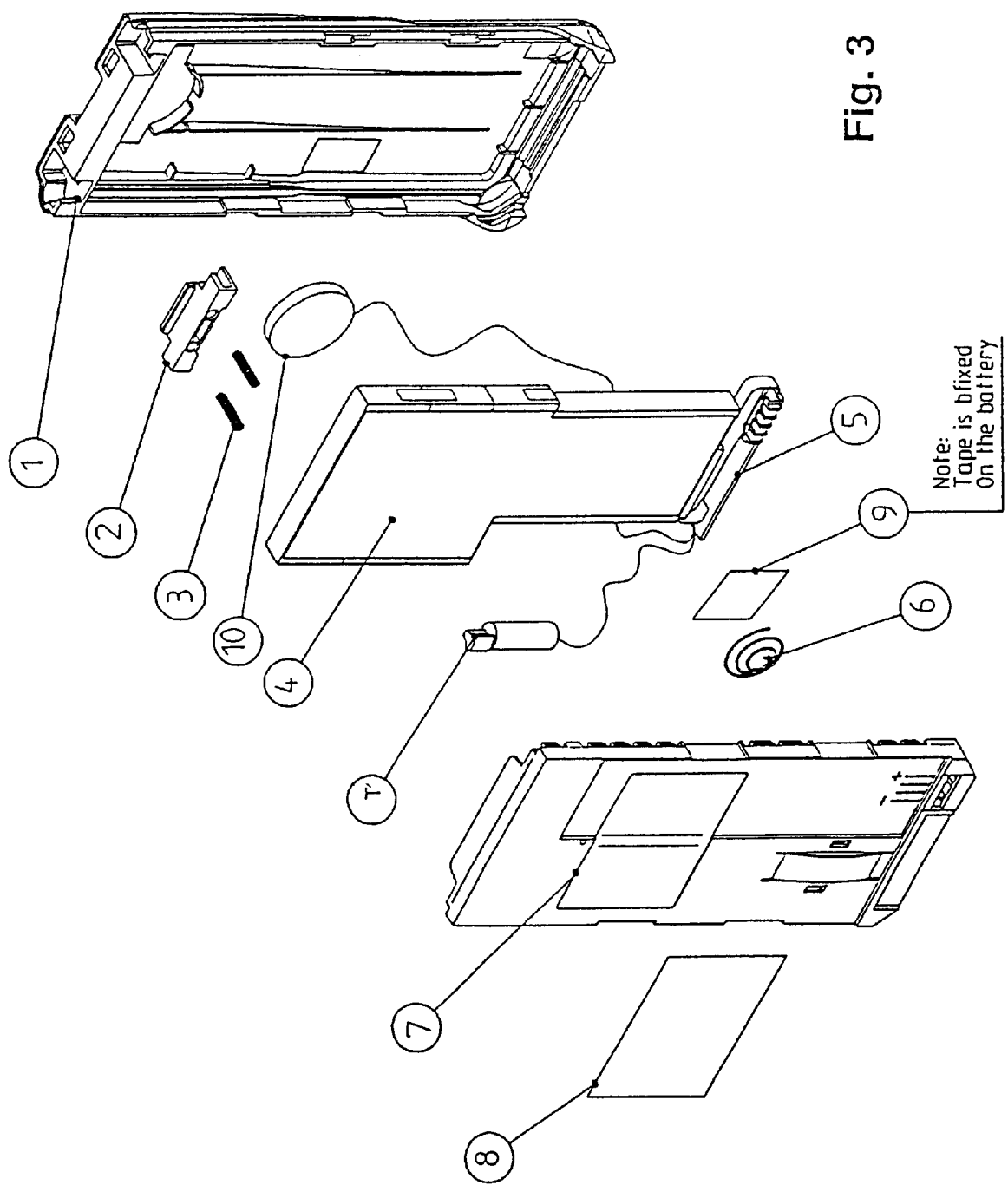
FIG. 3 shows a detailed structural drawing of a vibrating alarm arranged in a battery pack.

FIG. 3 shows in more detail one method of implementing a vibrating alarm in accordance with the invention in a battery pack. In the drawing, a battery pack is shown in perspective, partly disassembled. The back cover 1 of the battery pack is shown farthest to the right. It is connected to the telephone (11 in FIG. 1) by means 2 and 3. The housing (on the left) contains a space 7 for a subscriber identity module (SIM card) 8. The battery 4 (13 in FIG. 1) is installed between the back cover 1 and the housing. In the lower edge 5 of the battery pack there is a connector part (connector 14 in FIG. 1) which connects to the corresponding connector (connector 12 in FIG. 1) of the telephone. There is space in the battery pack for a vibrating alarm device.

It is an advantage of the invention that the user/customer may choose whether he wants a vibrating alarm in his telephone or not. This can be accomplished simply by changing battery packs. For example, a user may have two battery packs, one of which—a spare battery pack 4—is equipped with a vibrator T. The user installs in the telephone the battery pack and alarm function that he needs.

Figure 4A:
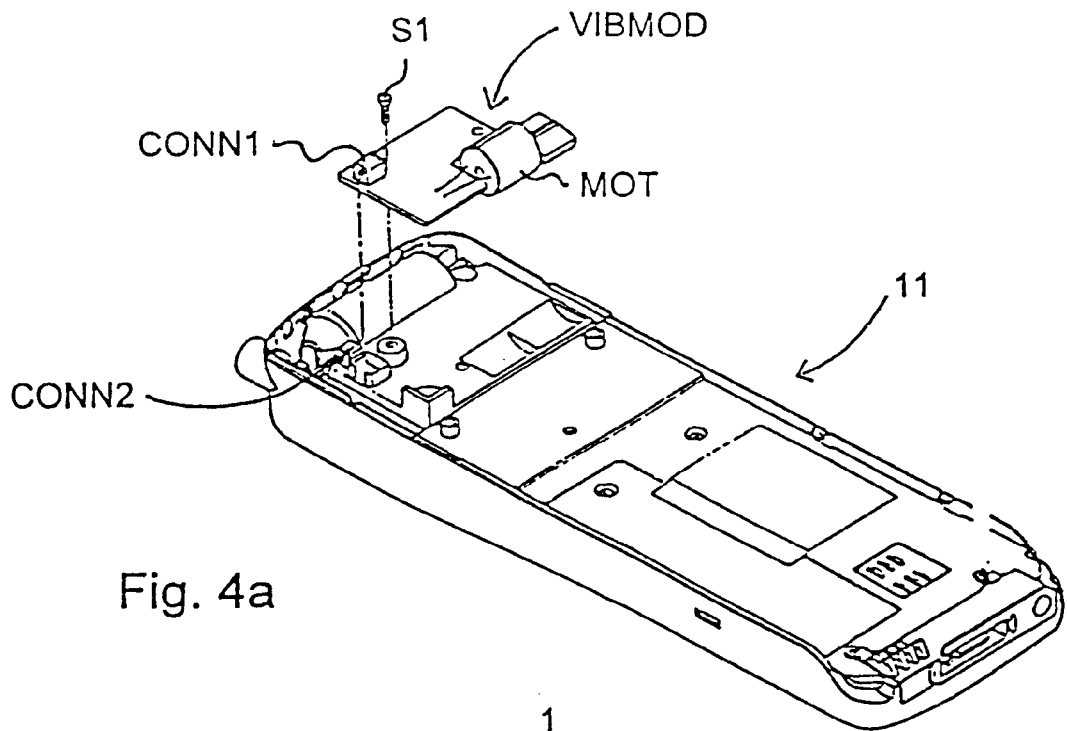
FIGS. 4a and 4b show a telephone with a separate detachably connectable module comprising a vibrating alarm.
Figure 4B:
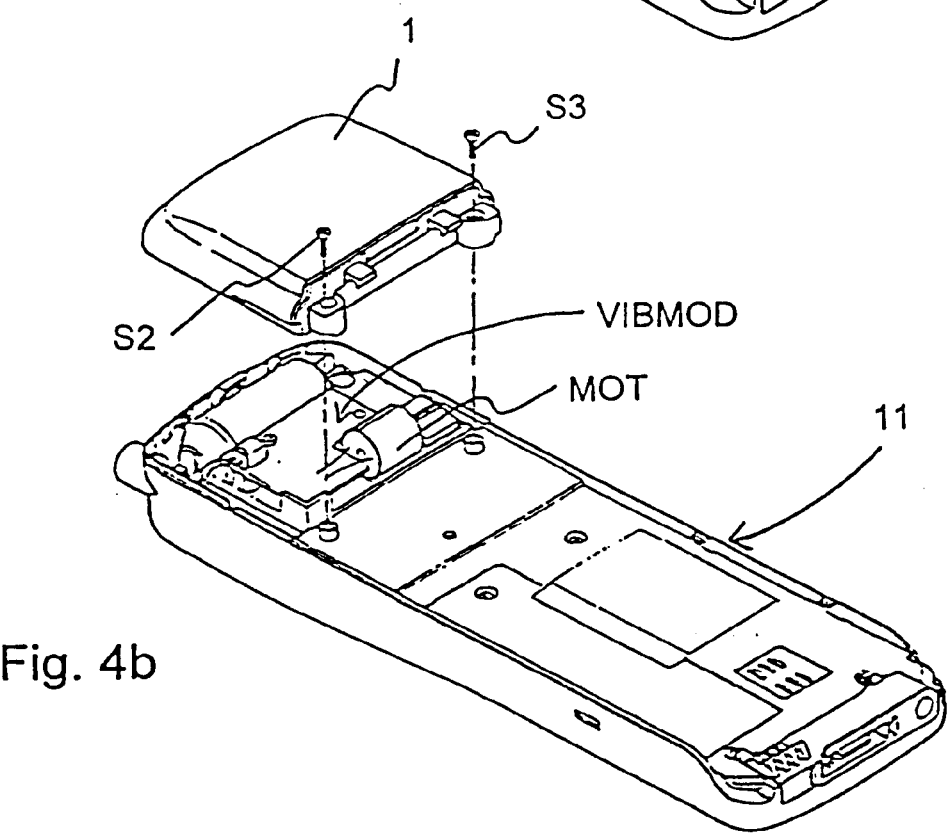

FIGS. 4a and 4b show in more detail another arrangement in accordance with the invention with a vibrating alarm alone in a separate detachably connectable module VIB-MOD which can be placed under the back cover 1 of the mobile phone. In FIG. 4a the mobile phone 11 is shown from the back with its back cover removed. A separate vibrator module VIBMOD having a vibrating motor MOT may be connected detachably to the phone by means of a connector CONN1 for connecting the operating voltage Vbatt and control VibCtrl to the module and a screw S1 for mounting the module firmly to the phone. Accordingly a connector CONN2 is arranged in the phone for connection to the vibrator module. By means of mechanical connection of the vibrator module to the body of the phone the vibration caused by the module is conducted to the whole body of the phone. FIG. 4b shows the back cover 1 being attached by means of two screws S2 and S3 to the phone 11 whereby the vibrator module VIBMOD is covered.

Naturally, the invention may be modified within the scope of the invention defined by the claims set forth below. Thus, it is possible that the vibrating alarm illustrated above is replaced with another mechanical device generating a silent alarm. Alternatively, it is possible to have another method for producing a silent alarm: e.g. a light, air, or electric signal.

The location of the silent alarm in the battery pack and between the body and the cover of the telephone are just examples. In principle, the battery pack or the separate vibrator module can be located outside the back cover or on the side of the body. Also, the silent alarm could exist in a separate module remote from the telephone.

What is claimed is:

1. A module for detachable connection to a telephone, comprising silent alarm means for generating a silent alarm, the silent alarm being actuable when connected to the telephone for indicating an incoming phone call, and a pin for providing information about the temperature of said module during charging, through which pin said means for generating a silent alarm is actuable.

2. A telephone comprising means for generating a silent alarm, means for generating an audible alarm, and a means for activating a silent alarm on the basis of a control signal characterized in that the means for generating a silent alarm is arranged in a module which is detachably connectable to the telephone and has a pin for providing information about the temperature of said module during charging, through which pin said means for generating a silent alarm is actuable.

3. A module as claimed in claim 1, wherein the module is adapted to receive control signals from the telephone to control the silent alarm means.

4. A module as claimed in claim 1, wherein the module is a battery pack for supplying power to the telephone.

5. A module as claimed in claim 1, wherein the silent alarm means comprises a vibrating device.

6. A module as claimed in claim 5, wherein the vibrating device comprises an eccentric electric motor.

7. A telephone operable for use with the module as claimed in claim 2, wherein the telephone comprises activating means for activating the silent alarm means of the module, for indicating an incoming phone call.

8. A telephone as claimed in claim 7, wherein the telephone comprises detection means for detecting whether the module is connected to the telephone.

9. A telephone as claimed in claim 7, wherein the telephone is appropriately conditioned to provide user selectable silent alarm modes when the module is connected to the telephone.

10. A telephone as claimed in claim 2, wherein there is connected to the silent alarm means a switch, a control signal of which is fed via a suitable pin in a connector strip between the detachably connectable module and the telephone to a control input of the switch so that an operating current for the silent alarm means is connected from an operating voltage through the silent alarm means and the switch to a ground potential.

* * * * *

UNITED STATES PATENT AND TRADEMARK OFFICE
CERTIFICATE OF CORRECTION

PATENT NO. : 6,324,412 B1
DATED : November 27, 2001
INVENTOR(S) : Alen et al.

It is certified that error appears in the above-identified patent and that said Letters Patent is hereby corrected as shown below:

<u>Title page,</u>
Delete the title and replace with the following: -- MOBILE TELEPHONE WITH VIBRATING ALARM --

Signed and Sealed this

Third Day of September, 2002

*Attest:*

*Attesting Officer*

JAMES E. ROGAN
*Director of the United States Patent and Trademark Office*